(12) United States Patent
Coenen

(10) Patent No.: US 10,833,582 B1
(45) Date of Patent: Nov. 10, 2020

(54) METHODS AND SYSTEMS OF POWER MANAGEMENT FOR AN INTEGRATED CIRCUIT

(71) Applicant: SEMICONDUCTOR COMPONENTS INDUSTRIES, LLC, Phoenix, AZ (US)

(72) Inventor: Ivo Leonardus Coenen, Coffrane (CH)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/806,429

(22) Filed: Mar. 2, 2020

(51) Int. Cl.
| | |
|---|---|
| *G06F 1/28* | (2006.01) |
| *G06F 1/32* | (2019.01) |
| *H02M 3/07* | (2006.01) |
| *G06N 3/04* | (2006.01) |
| *G06F 7/544* | (2006.01) |
| *H04R 25/00* | (2006.01) |

(52) U.S. Cl.
CPC ............ *H02M 3/07* (2013.01); *G06F 7/5443* (2013.01); *G06N 3/04* (2013.01); *H04R 25/602* (2013.01); *H04R 2225/33* (2013.01)

(58) Field of Classification Search
CPC .......... G06F 7/48; G06F 7/4824; G06F 7/544; G06F 1/3296; G06F 1/32; G06F 1/3203; G06F 1/3206; G06F 1/26
See application file for complete search history.

(56) References Cited

U.S. PATENT DOCUMENTS

| | | | |
|---|---|---|---|
| 9,323,320 B2* | 4/2016 | Fitzpatrick | ............ G06F 1/3287 |
| 9,689,917 B2* | 6/2017 | Turullols | ............... H03K 5/159 |
| 2002/0130705 A1 | 9/2002 | Meng et al. | |
| 2003/0093160 A1 | 5/2003 | Maksimovic et al. | |
| 2003/0132735 A1 | 7/2003 | Fulkerson | |
| 2004/0239394 A1 | 12/2004 | Miyazaki et al. | |
| 2012/0075005 A1 | 3/2012 | Flores et al. | |
| 2015/0241955 A1 | 8/2015 | Kosonocky et al. | |

* cited by examiner

*Primary Examiner* — An T Luu
(74) *Attorney, Agent, or Firm* — Dickinson Wright PLLC; Mark E. Scott

(57) ABSTRACT

Power management for an integrated circuit. One example embodiment is a method of operating a portable audio device including: reading, by a supply controller, a logic speed measurement from a logic gate delay line, the supply controller and the logic gate delay line implemented on a semiconductor substrate; computing, by the supply controller, a speed margin based on the logic speed measurement; creating, by the supply controller, a value indicative of a modified voltage level, the creating based on the speed margin; and modifying, by a main voltage converter on the semiconductor substrate, an output voltage responsive to the value indicative of the modified voltage level.

31 Claims, 6 Drawing Sheets

METHODS AND SYSTEMS OF POWER MANAGEMENT FOR AN INTEGRATED CIRCUIT

CROSS-REFERENCE TO RELATED APPLICATIONS

Not Applicable.

BACKGROUND

Low power consumption plays a key role in battery operated portable audio devices, such as hearing aids. Reducing the size of a hearing aid may enable a proper physical fit of the device to a human ear, for example into the ear canal. Reducing size may be achieved by reducing the power consumed by the device. Reducing size can be challenging since a hearing aid often runs complex algorithms that use integrated circuits to perform a large amount of digital processing. The power requirements of the digital logic in such a device can be substantial and often accounts for the largest portion of the total power consumption.

BRIEF DESCRIPTION OF THE DRAWINGS

For a detailed description of example embodiments, reference will now be made to the accompanying drawings in which.

DEFINITIONS

Figure 1:
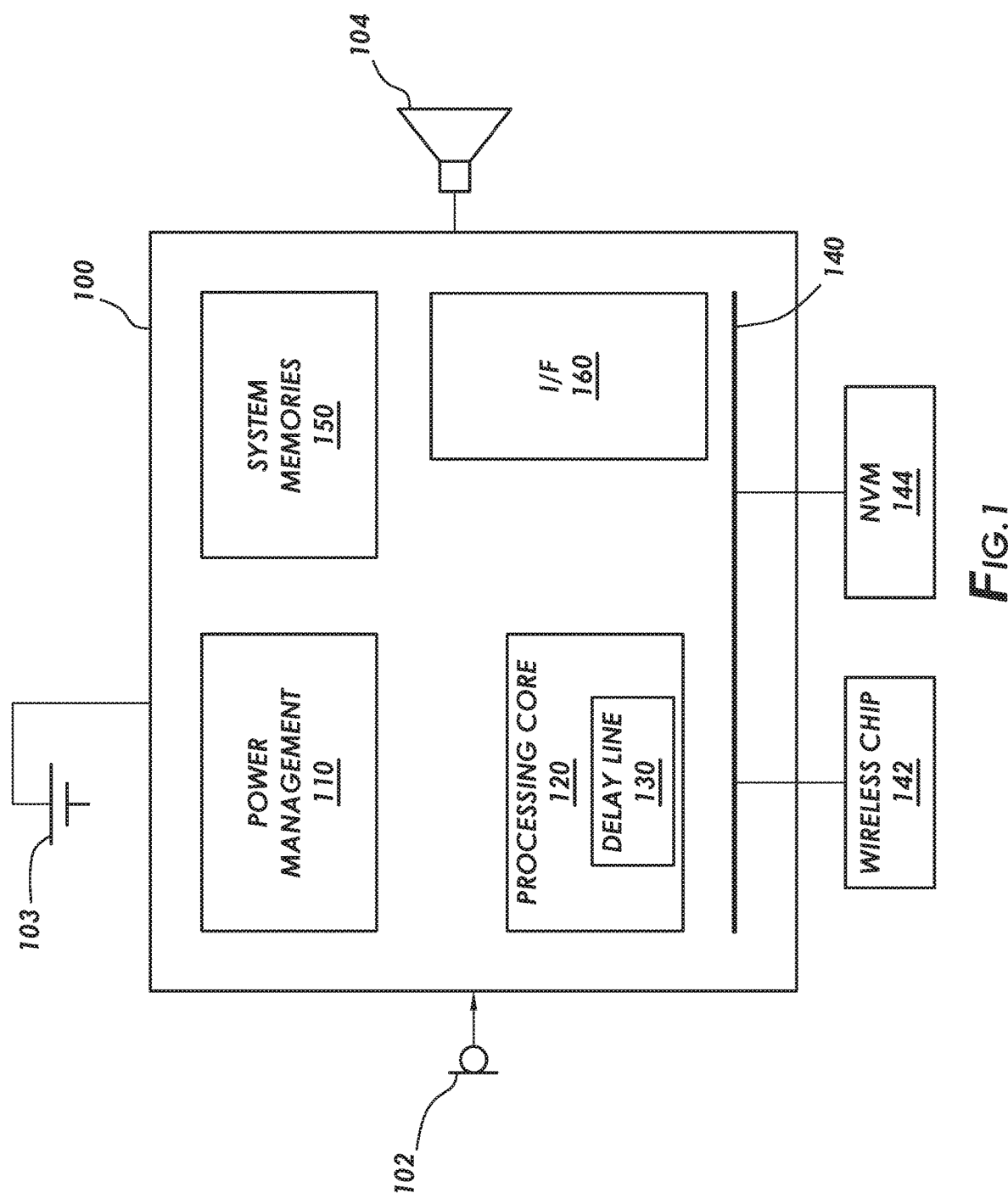
FIG. 1 shows, in block diagram form, a hearing aid integrated circuit in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

In relation to electrical devices (whether stand alone or as part of an integrated circuit), the terms "input" and "output" refer to electrical connections to the electrical devices, and shall not be read as verbs requiring action. For example, a voltage converter (such as switching power converter) may have a supply input, and the "input" defines an electrical connection to the voltage converter, and shall not be read to require inputting power to the operational amplifier. Similarly, the voltage converter may have a voltage output, and the "output" defines an electrical connection to the voltage converter, and shall not be read to require outputting voltage and/or power to from the voltage converter.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various example embodiments are directed to methods and systems of a power management system for an integrated circuit. More particularly, example embodiments are directed to power management systems for controlling an output voltage of a voltage converter to reduce power consumption of the integrated circuit. More particularly still, example embodiments are directed to reading a result from a logic gate delay line and modifying an output voltage of a voltage converter based on the result. Other example embodiments are directed to power management systems for controlling a body voltage driven to body connections of a plurality of transistors, to reduce a power consumption associated with leakage current. Further example embodiments are directed to power management systems for controlling a pump ratio of a charge pump, to reduce power consumption. Yet further example embodiments are directed to power management systems for controlling a body voltage by controlling a pump ratio of a charge pump. The specification first turns to an overall system to orient the reader.

FIG. 1 shows, in block diagram form, a hearing aid integrated circuit (IC) 100 in accordance with at least some embodiments that can be integrated into a hearing aid. The example hearing aid that comprises the hearing aid IC 100 has an associated battery 103, microphone 102, and a speaker 104 electrically coupled to the hearing aid IC 100. During operation, the hearing aid receives sound through the microphone 102, converts the sound waves to electrical signals, and forwards the electrical signals to be processed by the hearing aid IC 100. The processed signals are converted to sound waves by the speaker 104 and sent to the ear. The power for the example hearing aid is provided by a battery 103. As will be discussed in more detail below, the hearing aid IC 100 comprises a mechanism to adjust the power consumption by adaptively scaling a voltage provided to the various logic circuits of the hearing aid IC 100. For example, the voltage provided to the logic circuits can be reduced to a level that enables running the logic circuits at a specified operating frequency taking into account silicon process variation and temperature.

The example hearing aid IC 100 comprises: a power management 110, a processing core 120 with an embedded logic gate delay line 130, a communication bus 140, a plurality of system memories 150, and a plurality of system interfaces 160 (labeled "I/F 160" in the figure). The power management 110 is coupled to all the circuits on the hearing aid IC 100, and provides operational power. Though not shown in FIG. 1, the processing core 120, the system memories 150, and the system interfaces 160 are coupled to the communication bus 140. In example systems, the communication bus 140 may be part of the system interfaces 160. The system interfaces 160 are configured to couple to additional external devices, such as an Electrically Erasable Programmable Read Only Memory (EEPROM), volume control circuitry, a fitting connector, push button switches, and sensors. The example wireless chip 142 and the external non-volatile memory 144 are electrically coupled to the hearing aid IC 100 by way of the communication bus 140, or by way of separate communication buses (not specifically shown).

The system interfaces 160 (e.g., the communication bus 140) may take any suitable form, such as a serial peripheral interface (SPI), Dual SPI (DSPI), a Quad SPI (QSPI), an I2C interface, an I3C interface, an interface for Pulse Coded Modulation (PCM) signals, a Universal Asynchronous Receiver/Transmitter (UART) circuit, a General Purpose Input/Output (GPIO) pin, an embedded MultiMediaCard (eMMC), and a Low-Speed A/D (LSAD) converter. SPI, DSPI, and QSPI are serial primary-secondary-based communication interfaces that are synchronous and full duplex, and may be 3-wire or 4-wire based. On the other hand, I2C and I3C are serial protocols based on two-wire interfaces, configured to support multi-master features. The example PCM interface may be used to stream audio signal data into and out of the hearing aid 100. An example UART may comprise a logic circuit to transmit and receive asynchronous serial communication comprising data with a configurable format and a configurable speed. An example GPIO is a digital signal pin whose functionality, specifically input or output, may be determined during run-time. In example systems, the GPIO pins may connect to external digital inputs such as push buttons, or digital outputs such as a control or trigger of an external companion chip. The example eMMC may comprise an interface, a flash memory, and a flash memory controller, to provide an embedded non-volatile memory system. The example LSAD may provide analog-to-digital conversion of electrical signals for data processing purposes, and may include internal supply and ground inputs.

The processing core 120 carries out signal processing functionality, including a variety of Digital Signal Processing (DSP) algorithms as well as multiple types for wireless communication protocols. In one example, the processing core 120 includes at least one low-power DSP core, and a Reduced Instruction Set Computer (RISC). Example processing core 120 may further comprise a filter engine, and a plurality of hardware accelerators, which may be configurable. In further example systems, the processing core 120 may comprise a neural network hardware accelerator to implement a neural network functionality, including fetching a plurality of weights from a weights memory and carrying out a plurality of multiply-accumulate (MAC) operations that operate in parallel. The MAC operations may repetitively multiply an input value and a weight selected from the plurality of weights to accumulate the result of the multiplication to a sum of products representing a value corresponding to a neuron in the neural network.

The power management 110 comprises circuitry configured to implement adaptive voltage scaling, to modify the voltage supplied to the logic circuits, and thereby reduce the power consumed by the hearing aid. In some cases a single battery is sufficient, but in other cases multiple batteries (e.g., in series, or in parallel) may be used. A variety of types of batteries can be used in hearing aids, dependent on the type of hearing aid. In example systems, the batteries provide a supply voltage of less than 2V. In some cases, the batteries are rechargeable, in other cases they are disposable.

The power management 110 is communicatively coupled to the logic gate delay line 130 within the processing core 120, and may read a measurement result created by the logic gate delay line 130. The logic gate delay line 130 and the measurement result therefrom are discussed in greater detail below. Nevertheless, once read, the measurement result is further processed by the power management 110 and used to control one or more power converters (e.g., a switch-mode power converter, or a charge pump) within the power management 110.

Still referring to FIG. 1, the hearing aid IC 100 communicates with an example external wireless chip 142 by way of the communication bus 140. In example systems, the wireless chip 142 includes a multi-protocol system-on-a-chip (SoC) to implement a variety of wireless communication related schemes. For example, the wireless chip 142 may include a SoC to implement Bluetooth Low Energy (BLE) and/or a plurality of 2.4 GHz ultra-low-power wireless applications. Further in the example system, a non-volatile memory 144 is coupled to the hearing aid IC 100 by way of the communication bus 140. The non-volatile memory 144 may comprise any suitable non-volatile member, such as an EEPROM, a flash memory, a mass storage device, or combinations. The specification now turns to a more detailed description of the power management 110.

Figure 2:
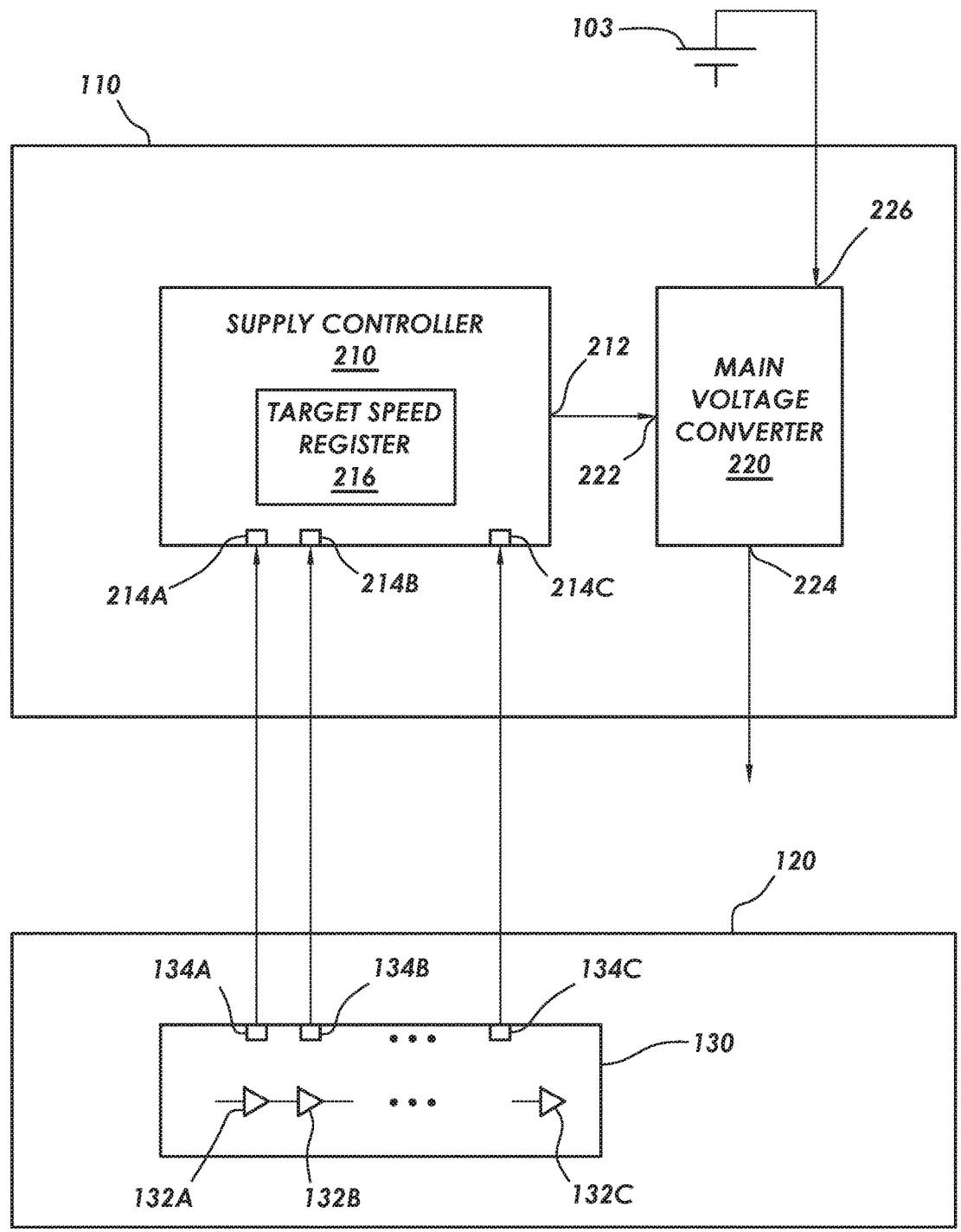
FIG. 2 shows a block diagram of the power management system and the processing core in accordance with at least some embodiments.

FIG. 2 shows a block diagram of a power management system and processing core in accordance with at least some embodiments. In particular, the example power management 110 comprises a supply controller 210 and a main voltage converter 220. The main voltage converter 220 defines a main control input 222, a main supply input 226, and a main voltage output 224. The main supply input 226 is coupled to the battery 103, and the main voltage output 224 is coupled to and provides operation power to all the logic circuits of the hearing aid IC 100. The example supply controller 210 defines a plurality of gate inputs 214A-C, and a main control output 212. The main control output 212 is coupled to the main control input 222 of the main voltage converter 220. The main voltage converter 220 is configured to vary a voltage driven to the main voltage output 224 responsive to a signal the main control input 222.

Embedded within the processing core 120 is the logic gate delay line 130. The example logic gate delay line 130 defines a plurality of gate outputs 134A-C coupled to the gate inputs 214A-C of the supply controller 210. While only three gate outputs 134A-C are shown (and thus only three gate inputs 214A-C are shown), the logic gate delay line 130 may define any suitable number of gate outputs 134. In embodiments, the number of output gates 134 depends on the number of bits specified for the result. For example, the number of gate outputs 134 suitable for a 3-bit result may be 7. In another example, the number of gate outputs 134 suitable for a 4-bit result may be 15. The example logic gate delay line 130 comprises a plurality of delay elements 132A-C coupled to the plurality of gate outputs 134A-C. While only three delay elements 132A-C are shown in FIG. 2, the logic gate delay line 130 may define any suitable number of delay elements 132. The plurality of delay elements 132 may comprise a plurality of serially aligned buffers. The logic gate outputs 134 may each comprise the logic output of a flip-flop. In further example systems, each logic gate output 134 may comprise a flip-flop that is further associated with re-capture logic (not shown). For instance, the re-capture logic may comprise a multiplexer, configured to reduce a meta-stability by feeding a captured signal first into a multiplexer and then into a logic gate output 134. In an example, in a following clock cycle, the signal may be fed back into the multiplexer input and then logic gate output 134, to achieve resynchronization. The delay line of the logic gate delay line 130 may be placed along and run beside the longest physical digital logic processing path within the processing core 120. The hearing aid IC 100 may comprise more than one logic gate delay line. In example cases, the hearing aid IC 100 may comprise a plurality of logic gate delay lines configured to decrease effects of on-chip process variation.

The logic gate delay line 130 is configured to produce a logic speed measurement or measurement result read by the power management 110. In particular, when the logic gate delay line 130 is in operation, a transition is driven onto the logic gate delay line 130. For instance, the transition may comprise a de-asserted state transitioning into an asserted state, or an asserted state transitioning to a de-asserted state. The transition propagates along the logic gate delay line 130 through the various delay elements. The logic gate outputs 134 capture the result at predetermined measurement points (e.g., a predetermined period of time after the transition is driven onto the logic gate delay line 130), for example at a transition of the next clock cycle. A logic gate output 134, storing an initial '0' value, captures a '1' value if the signal indicative of the transition has propagated along the logic gate delay line to reach the particular logic gate output 134. As such, which logic gate outputs 134 capture a '1' value responsive to a transition is indicative of the propagation distance along the delay line within a predetermined period, based on which a measured logic speed is determined by the supply controller 210.

An example logic gate delay line 130 may comprise a synthesized logic block comprising a plurality of standard cells (e.g., buffers, logic AND gates). The verification scheme for the example logic gate delay line 130 may comprise a static timing analysis (STA) based on a plurality of standard cells under operating conditions that may include Process-Voltage-Temperature (PVT) and/or clock frequency. Inasmuch as the logic gate delay line 130 resides alongside a path (e.g., the longest path) through the processing core 120, the delay line 130 may thus comprise a comparison to a computation path through the hearing aid IC 100. Thus, the results of the logic gate delay line 130 (e.g., how far along the logic gate delay line 130 an asserted or de-asserted state propagates within a predetermined period of time) may be indicative of the setup timing margin of the processing core 120.

In accordance with example embodiments, the supply controller 210 is configured to read the plurality of logic gate outputs 134A-C from the logic gate delay line 130. The example supply controller 210 creates a logic speed measurement based on reading the plurality of logic gate outputs 134A-C, and uses the logic speed measurement to compute a speed margin. Based on the speed margin, the example supply controller 210 drives a value indicative of a modified voltage level to the main control output 212 to adjust the output voltage created by the main voltage converter 220.

More particularly, the supply controller 210 reads the gate outputs 134 indicating a distance along the logic gate delay line 130 a transition (e.g., asserted state) propagated within a predetermined period of time. Based on the logic speed measurement, the supply controller 210 may compute a speed margin. The speed margin may be determined during characterization of the hearing aid IC 100. In an example system, the speed margin may be specified based on a setup time which, in turn, comprises a minimum time during which the logic is stable before the arrival of a subsequent clock edge. The speed margin may be specific to operating conditions that may include Process-Voltage-Temperature (PVT) and clock frequency. In an example system, the higher a number corresponding to the entirety of values captured by the logic gate outputs 134 (i.e., the farther along the delay line a transition propagates), the higher the speed margin associated with the hearing aid IC 100. Conversely, the lower a number corresponding to the entirety of values captured by the logic gate outputs 134, the lower the speed margin associated with the hearing aid IC 100. The speed margin may be used to drive a value indicative of modified voltage level to the main control input 222 of the main voltage converter 220.

Consider, as an example, that the logic gate delay line 130 comprises ten logic gates, and thus ten logic gate outputs 134. Further consider that the logic gates are reset or de-asserted prior to starting a test. In an example case, an asserted state is applied to the first logic gate on a first edge of a clock signal, and then the state of each logic gate output 134 is read on the next edge of the clock signal. If the asserted state propagated halfway along the logic gate delay line 130, the reading may take the form 1111100000 for a particular combination of clock speed and applied voltage. If the clock speed is increased (all other things held equal), the next logic speed measurement may be 1100000000 (i.e., there was less time for the asserted state to propagate). Oppositely, if the clock speed is decreased (all other things equal), another logic speed measurement line might be 1111111100 (i.e., there was more time for the asserted state to propagate).

In example systems, the supply controller 210 may comprise a target speed register 216. During initialization of the hearing aid IC 100, the target speed register 216 may be written with a target speed value for the particular hearing aid IC 100. The target speed value may be determined using STA and/or during characterization of the hearing aid IC 100 after manufacture, and thus may account for differences caused by differences in manufacturing (e.g., slighting doping differences, variance in line widths, variance in oxide thicknesses, and the like), and clock jitter. Nevertheless, the example supply controller 210 determines the speed margin based on the difference between the logic speed measurement and the target speed value stored in the target speed register 216. More specifically, the supply controller 210 may determine the speed margin from the amount by which the logic speed measurement is faster or slower than the target speed value, and use speed margin to determine a modified voltage level. Specifically, if the logic speed measurement is faster than the target speed value, the supply controller 210 may set the value of the modified voltage to be lower than a current output voltage. In a similar way, if the measured logic speed is slower than the target speed value, the supply controller 210 may set the value of the modified voltage to be higher than a current output voltage. Responsive to setting the value of the modified voltage, the supply controller 210 may then drive a signal indicating a modified voltage level to the main control input 222 of the main voltage converter 220.

Consider, as an example, that the target speed register 216 holds a target speed value that directly or indirectly indicates that, in a system with ten gates in the logic gate delay line 130, the target speed is met when the asserted state propagates through five of the ten gates (e.g., the target reading may be 1111100000). If the logic speed measurement produces reading of, for example, 1111111100, then the target speed measurement results in a speed margin that is an incremental distance of three logic gates beyond the target point. In such a situation, the system may speed up the clock or change the voltage (or both) to increase performance of the processor. On the other hand, if the logic speed measurement produces reading of, for example, 1100000000, then the target speed measurement results in a speed margin that is an incremental distance of three logic gates before the target point. In such a situation, the system may slow the clock or change the voltage (or both) to reduce internal logic errors. It will be understood that the supply controller 210 need not work directly with the position-coded example results shown above. The system may, for example, encode the distance result as a magnitude of a number having a smaller number of bits (e.g., 3-bit result for a logic gate delay line of 7 gates, or a 4-bit result for a logic gate delay line of 15 gates). The specification now turns to a description of an example main voltage converter 220 in greater detail.

The main voltage converter 220 may create a desired output voltage, responsive to the signal driven by the supply controller 210 onto the main control input 222. When in use, responsive to a value or signal driven onto the main control input 222 (e.g., a value indicative of a modified voltage level), the main voltage converter 220 may modify an output voltage level to drive the modified output voltage to the main voltage output 224. In example systems, the main voltage converter 220 may not increase the output voltage level above a predetermined upper level, and/or may not decrease the output voltage level below a predetermined lower level.

The main voltage converter 220 may comprise any suitable device configured to provide an output voltage based on a supply voltage. In an example system, the main voltage converter 220 may comprise a charge pump configured to generate an output voltage that may be a predetermined ratio of the supply voltage. The ratio may be programmable to any suitable value. In example systems, suitable values may include ratios such as '1/1' (LDO mode, charge pump disabled), '4/5', '3/4', '2/3', '1/2', and '1/3'. Thus, by changing the ratio and/or the operating frequency, the output voltage may be selectively controller. In a further example system, the main voltage converter 220 may comprise a switched-mode power converter configured to generate a modified output voltage by varying a duty cycle of a switching device. In another example system, the main voltage converter 220 may comprise a linear regulator comprising a step-down converter configured to modify an output voltage. In yet still other cases, the linear regulator may be combined with another device (e.g., charge pump, switched-mode power converter) to supply and regulate the output voltage.

Figure 3:
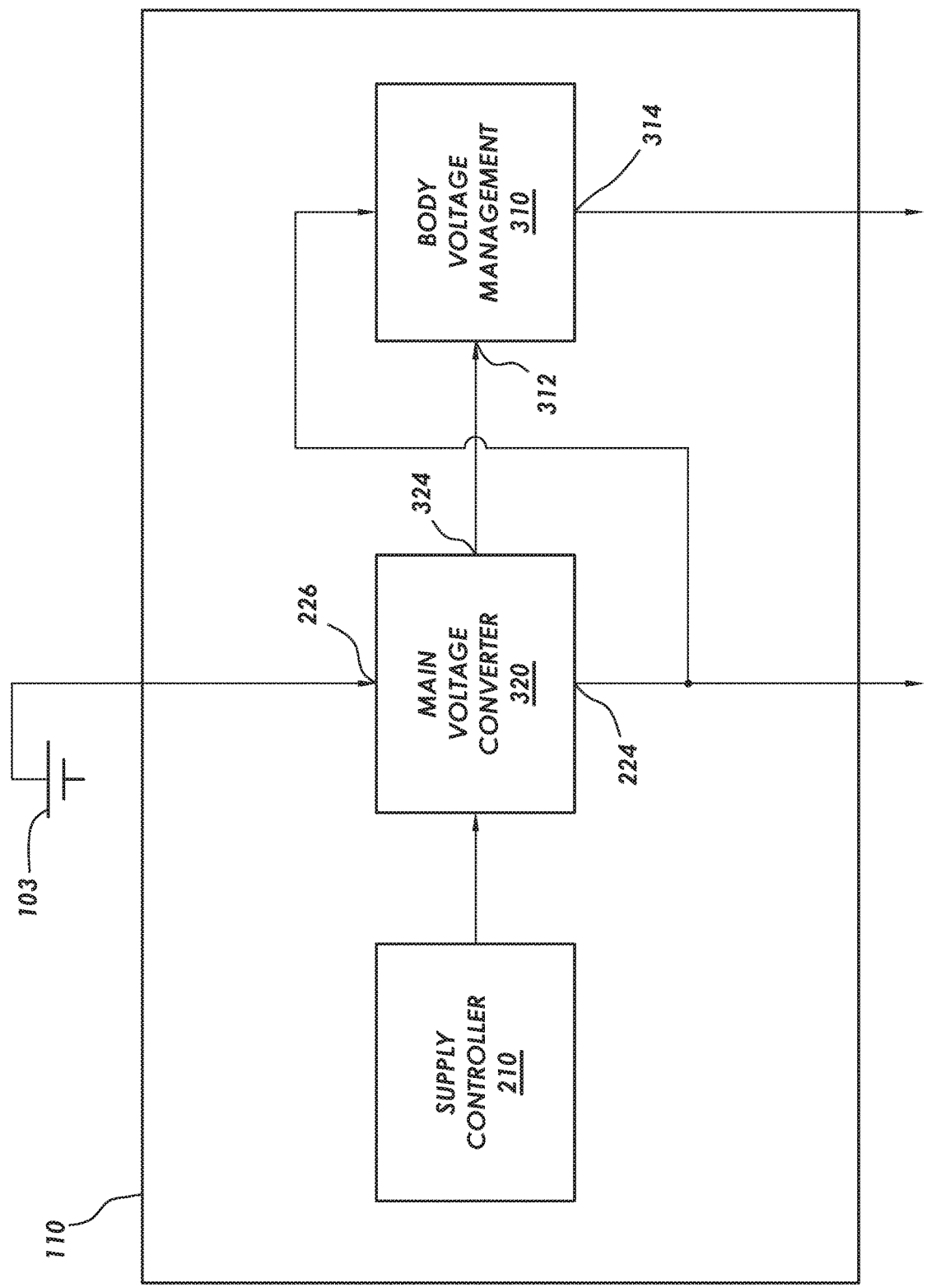
FIG. 3 shows a block diagram of a body voltage management in accordance with at least some embodiments.

FIG. 3 shows a block diagram of an example power management 110 in accordance with alternative embodiments. The example power management 110 comprises the supply controller 210 introduced previously, a main voltage converter 320, and a body voltage management 310. Again, the supply controller 210 defines the main control output 212. The main voltage converter 320 defines the main supply input 226, the main voltage output 224, a main drive output 324. As before, the main supply input 226 is coupled to the battery 103, and the main voltage output 224 is coupled to and provides operation power to all the logic circuits of the hearing aid IC 100. The main voltage output 224 is also coupled to the body voltage management 310. The body voltage management 310 defines a drive input 312 and a body voltage output 314. The drive input 312 is coupled to the main drive output 324. The body voltage output 314 coupled to a plurality of body connections of transistors within the processing core 120 (not specifically shown).

During operation, the example power management 110 may reduce a combined power consumption associated with the hearing aid IC 100. The combined power may comprise a dynamic power and power associated with a leakage current. The example power management 110 may adjust dynamic power consumption (e.g., by adjusting the voltage provided by the main voltage converter 320) and adjust leakage current (e.g., by adjusting a voltage provided by the body voltage management 310). For instance, during operation, when the hearing aid IC 100 is processing signals, the example power management 110 may adjust, alone or in combination, dynamic power consumption and leakage current depending on audio processing intensity, which may depend on the audio environment classification.

The example power management 110 of FIG. 3 may be configured to modify the output voltage of the main voltage converter 320, as described in FIGS. 1 and 2. The example power management 110 may further be configured to measure a value indicative of dynamic power consumption and, responsive to the measuring, vary a body bias or a body voltage driven to a plurality of transistors, to modify leakage current and threshold voltage. Altering body voltage may enable altering transistor speed, thereby altering leakage current. More specifically, increasing the speed of a transistor may increase leakage current, and decreasing the speed of a transistor may decrease leakage current.

In addition to providing an output voltage on the main voltage output 224, the example main voltage converter 320 drives a signal indicative of power consumption to the main drive output 324, as will be described in more detail in FIG. 4 below. Similar to the example main voltage converter 220, the main voltage converter 320 may comprise any suitable device configured to provide an output voltage based on a supply voltage. For example, the main voltage converter 320 may comprise a charge pump, a switched-mode power supply, a linear regulator, and/or a charge pump and linear regulator.

Figure 4:
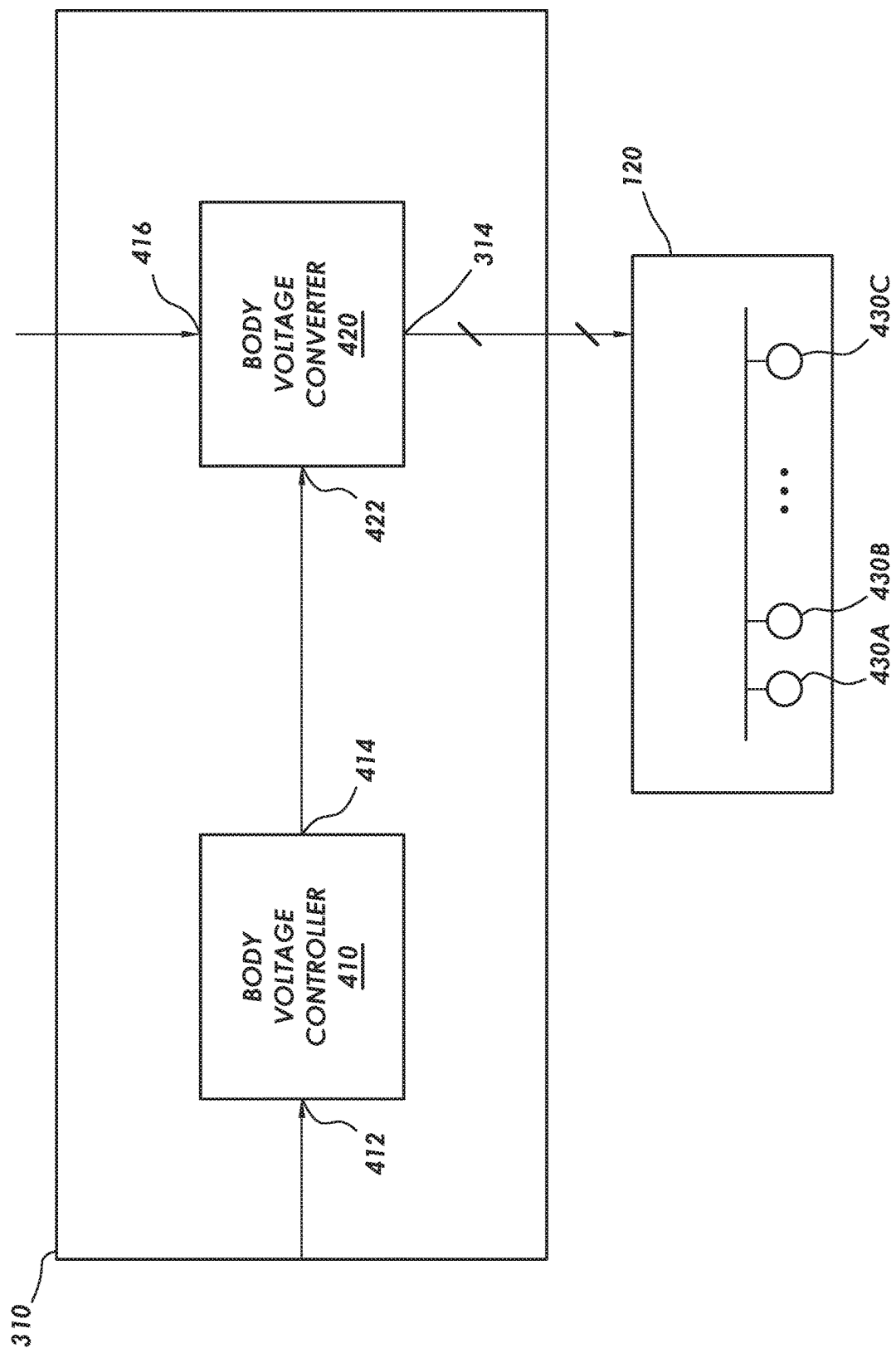
FIG. 4 is a block diagram of a body voltage management in accordance with at least some embodiments.

FIG. 4 is a block diagram of an example body voltage management 310 in accordance with at least some embodiments. The body voltage management 310 comprises a body voltage controller 410, and a body voltage converter 420. The body voltage controller 410 defines a drive input 412, and a body control output 414. The drive input 412 is coupled to the main drive output 324 of the main voltage converter 320 (FIG. 3). The body voltage converter 420 defines a body control input 422, a body supply input 416, and a body voltage output 314 to provides one or more body bias voltages. For example, the body voltage output 314 may be configured to provide a body bias voltage for N-type metal-oxide-semiconductor (NMOS) transistors and a body bias voltage for P-type metal-oxide-semiconductor (PMOS) transistors. The body supply input 416 is coupled to the main voltage output 224 (not shown). The body control output 414 is coupled to the body control input 422 of the body voltage converter 420. As shown in FIG. 4, the body voltage output 314 is coupled to the body connections of a plurality of transistors 430A-C of the processing core 120. While only three transistors 430A-C are shown in FIG. 4 so as not to unduly complicate the figure, the body voltage converter 420 may be coupled to any suitable number of transistors 430A-C, including all the transistors of the processing core 120.

The body voltage management 310 may be configured to modify the body voltage associated with or applied to the transistors 430A-C. Modifying the body voltage may, for example, enable changing a threshold voltage associated with transistors 430A-C to modify transistor speed, thereby modifying associated leakage current. For example, the body voltage management 310 may be configured to apply a body bias voltage to change the threshold voltage, to alter transistor speed. More details on the operation of the body voltage management 310 are provided below.

Still referring to FIG. 4, the example body voltage controller 410 measures a signal indicative of power provided on the main drive output 324 of the main voltage converter 320. In example systems, the main voltage converter 320 may be configured to perform actions associated with voltage conversion as long as the value driven to the body voltage output 314 is within a specified voltage level range, and may be configured to refrain from performing actions if the value is outside the specified voltage level range. As such, measuring the signal indicative of power consumption may be based on counting a number of actions associated with the main voltage converter 320. Specifically, the body voltage controller 410 may count the number of actions performed by the main voltage converter 320 within a predetermined period of time, and associate the number of actions with power consumption by the hearing aid IC over the predetermined period time. In an example system, the main voltage converter 320 comprises an asynchronous charge pump, and the body voltage controller 410 may be configured to count a number of pump actions of the charge pump over the predetermined period of time multiplied with a factor that determines the amount of energy per pump action that depends on the charge pump ratio configuration, to determine a value indicative of power consumption. In another example system, the main voltage converter 320 comprise an asynchronous switched-mode power converter, and the body voltage controller 410 may be configured to count a number of main switch assertions of the switched-mode power converter over a predetermined period of time, to determine a value indicative of power consumption.

Responsive to the signal indicative of power consumption, the body voltage controller 410 may create a value associated with a body voltage, and drive the value to the body control output 414. The value may indicate modification of the body voltage such that the body voltage reduces power consumption associated with the transistors 430A-C, and/or leakage current associated with the plurality of transistors 430A-C. In an example, the body voltage may reduce the sum of the power consumption associated with the transistors 430A-C, and the power consumption associated with leakage current. In an example system, the value driven to the body control output 414 may be associated with adjusting a body bias voltage of a NMOS transistor in one direction, and adjusting a body bias voltage of a PMOS transistor in an opposite direction.

In an example system, the body voltage controller 410 may determine whether power consumption has increased or decreased within a predetermined period of time. Based on whether power consumption has increased or decreased, the body voltage controller 410 (and thus the body voltage management 310) in the example system may increase or decrease a body bias voltage applied to the transistors 430A-C by modifying the value to the body control output 414, for example via configured step sizes. In some example systems, the body voltage controller 410 may be configured to vary the value to the body control output 414 so as to stay within a predetermined range.

The body voltage converter 420 may take any suitable form, such as: a charge pump; a switched-mode power supply; a linear regulator; and/or a charge pump and linear regulator. When in use, responsive to the body control input 422, the body voltage converter 420 is configured to vary a voltage a voltage driven on the body voltage output 314. In some example cases the main voltage converter 220/320 may be a charge pump. In cases where the main voltage converter 220/320 is a charge pump, in addition to varying the output voltage driven to the main voltage output 224 to reduce power consumption, additional power reduction may be possible by selective control of the charge pump ratio.

Figure 5A:
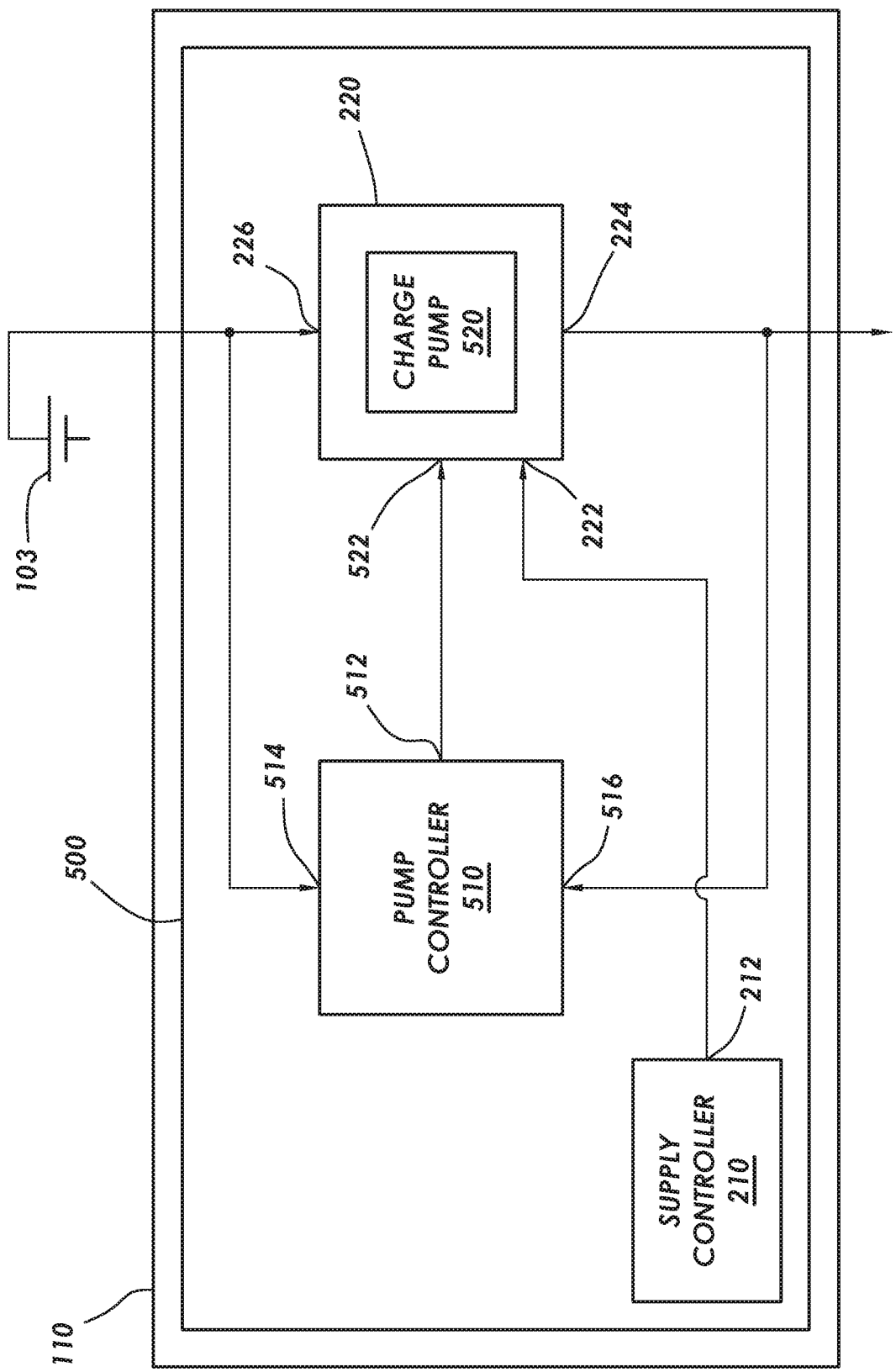
FIG. 5*a* shows a block diagram of the power management system in accordance with at least some embodiments.

FIG. 5a shows a block diagram of an example power management 110 comprising a charge pump management 500 in accordance with at least some embodiments. The charge pump management 500 is configured to implement a system to control the charge pump ratio. The example charge pump management 500 comprises the supply controller 210 previously introduced, the main voltage converter 220 in the form of a charge pump 520, and a pump controller 510. As before, the supply controller defines the main control output 212. The pump controller 510 defines a first input 514 coupled to the main supply input 226, a second input 516 coupled to the main voltage output 224, and a pump ratio output 512. As before, the main voltage converter 220 defines the main supply input 226, the main voltage output 224, and the main control input 222. The example charge pump 520 defines a pump ratio input 522 and the main voltage output 224. The main control output 212 of the supply controller 210 is coupled to the main control input 222 of the main voltage converter 220. The pump ratio input 522 is coupled to the pump ratio output 512.

The pump controller 510 is configured to read, via the first input 514, a value indicative of a voltage supplied to the charge pump 520 (e.g., to read the battery 103 voltage). Moreover, the example pump controller 510 is configured to read, via the second input 516, a value indicative of the voltage driven to the main voltage output 224. Based on the values read at the first input 514 and the second input 516, the pump controller 510 is configured to drive a signal to the pump ratio output 512 to select a pump ratio for the charge pump 520. In example cases, the pump controller 510 may divide the value indicative of the voltage supplied to the charge pump 520 by the value indicative of the voltage driven to the main voltage output 224, to create a result. Based on the result, the pump controller 510 may determine a charge pump ratio, a threshold ratio value, and a hysteresis. The pump controller 510 may drive the charge pump ratio to the pump ratio input 522 of the charge pump 520. The charge pump 520 may operate with an operating feature responsive to the pump ratio input 522. For example, the charge pump may create an output voltage based on the operating feature.

The pump controller 510 may further be configured to reduce the number of switches between two different charge pump ratios. In various example systems, the pump controller 510 may be coupled to a configuration register (not shown) to store a programmable threshold ratio value and a configurable hysteresis. In example systems, the value of the threshold ratio may be programmed to a preferred switching ratio. When in use, the pump controller 510 may compare a computed charge pump ratio, obtained based on a division, with the threshold ratio. The pump controller 510 may then make a decision, based on the division and taking the hysteresis into account, whether to switch from a current charge pump ratio to the computed charge pump ratio.

Figure 5B:
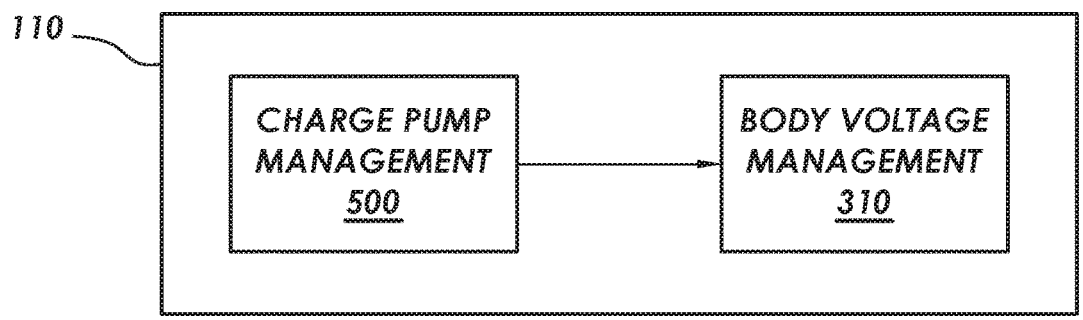
FIG. 5*b* shows a block diagram of the power management system in accordance with at least some embodiments.

FIG. 5b is a block diagram of an example power management 110 that is configured to implement a system to control a body voltage control and to further automatically control a charge pump ratio. The example power management 110 comprises the charge pump management 500 and the body voltage management 310. The charge pump management 500 is coupled to the body voltage management 310. In an example system, the charge pump management 500 may be coupled to the body voltage management 310 by means of the drive input 412. The various components of the example power management 110 have been described in details in the previous figures.

Figure 6:
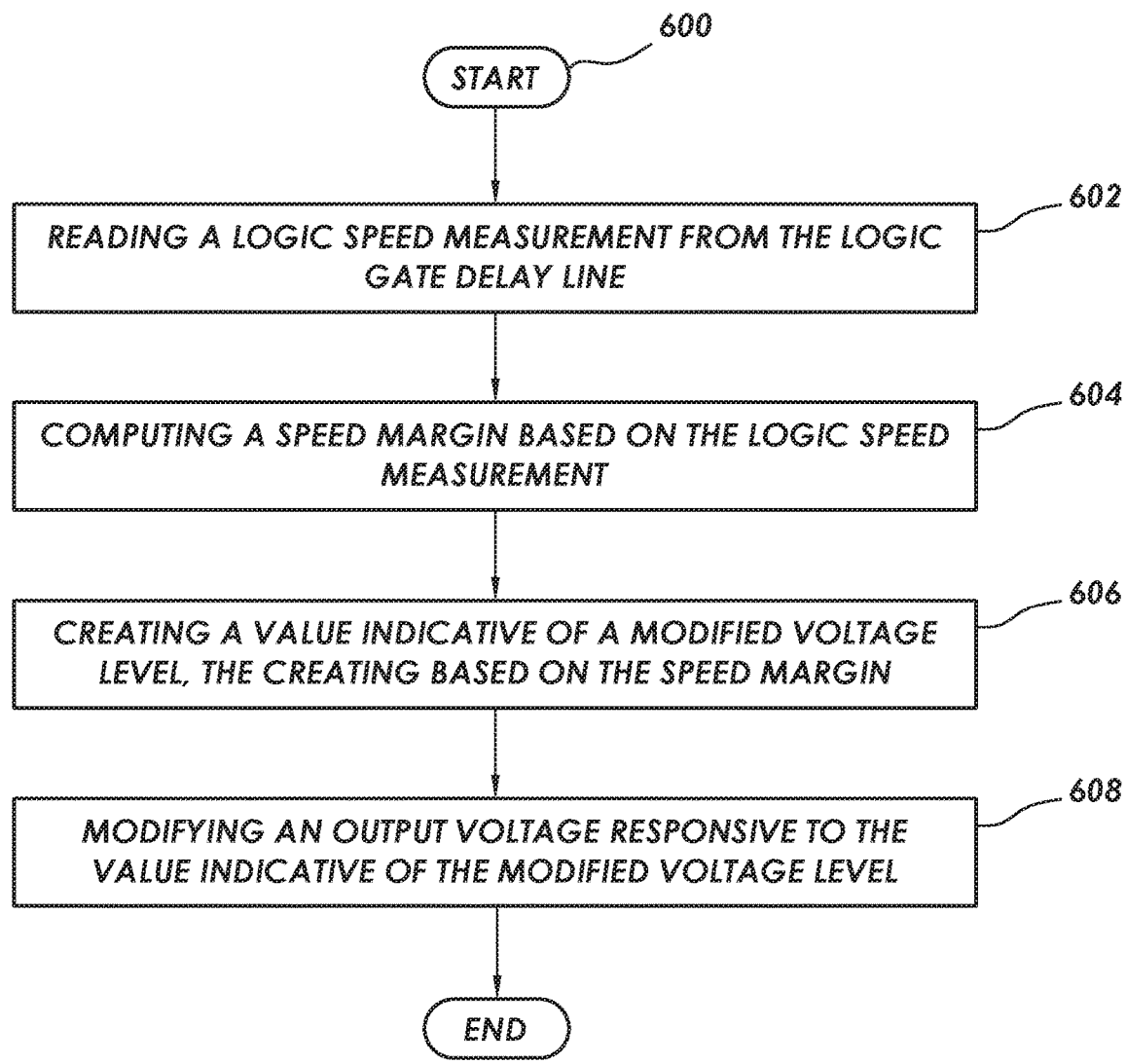
FIG. 6 shows a flow diagram of a method in accordance with at least some embodiments.

FIG. 6 shows a method in accordance with at least some embodiments. In particular, the method starts (block 600) and comprises: reading, by the supply controller, a logic speed measurement from the logic gate delay line (block 602); computing, by the supply controller, a speed margin based on the logic speed measurement (604); creating, by the supply controller, a value indicative of a modified voltage level, the creating based on the speed margin (block 606); and modifying, by the main voltage converter on the semiconductor substrate, an output voltage responsive to the value indicative of the modified voltage level (block (608). Thereafter, the method may end (block 610).

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating an integrated circuit on a semiconductor substrate, the method comprising:
    reading, by a supply controller, a logic speed measurement from a logic gate delay line, the supply controller and the logic gate delay line implemented on a semiconductor substrate;
    computing, by the supply controller, a speed margin based on the logic speed measurement;
    creating, by the supply controller, a value indicative of a modified voltage, the creating based on the speed margin; and
    modifying, by a main voltage converter on the semiconductor substrate, an output voltage responsive to the value indicative of the modified voltage.

2. The method of claim 1:
    wherein computing the speed margin further comprises determining a difference between the logic speed measurement a target speed value;
    wherein modifying the output voltage further comprises at least one selected from a group comprising: increasing the output voltage responsive to the value indicative of the modified voltage; and decreasing the output voltage responsive to the value indicative of the modified voltage.

3. The method of claim 2 wherein determining the difference between the logic speed measurement the target speed value further comprises determining an amount the logic speed measurement was faster or slower than the target speed value.

4. The method of claim 1 wherein reading the logic speed measurement further comprises determining a distance along the logic gate delay line that an asserted state propagated within a predetermined period of time.

5. The method of claim 1 wherein the main voltage converter further comprises at least one selected from a group consisting of: a charge pump; a switched-mode power converter; and a linear regulator.

6. The method of claim 1 further comprising:
    measuring, by a body voltage controller, a signal indicative of power consumption of devices on the semiconductor substrate, the body voltage controller implemented on the semiconductor substrate;
    creating, by the body voltage controller, a value indicative of a modified body voltage, the creating based on a signal indicative of power consumption; and
    modifying, by a body voltage converter on the semiconductor substrate, a body voltage applied to a plurality of transistors on the semiconductor substrate, the modification to the responsive to the value indicative of the modified voltage.

7. The method of claim 6 wherein creating the value indicative of the modified body voltage further comprises creating the value indicative of the modified body voltage such that the body voltage reduces at least one selected from a group comprising: power consumption of the plurality of transistors; and leakage current of the plurality of transistors.

8. The method of claim 7 wherein the main voltage converter comprises a charge pump, and wherein measuring the signal indicative of power consumption further comprises counting a number of pump actions performed by the charge pump.

9. The method of claim 7 wherein the main voltage converter comprises switched-mode power converter, and wherein measuring the signal indicative of power consumption further comprises counting a number of main switch assertions of the switched-mode power converter.

10. The method of claim 6 wherein the main voltage converter is a charge pump, and the method further comprises:
    reading, by a pump controller, a value indicative of a voltage supplied to the charge pump, the pump controller implemented on the semiconductor substrate;
    reading, by the pump controller, a value indicative of the output voltage of the charge pump;
    dividing, by the pump controller, the value indicative of the voltage supplied by the value indicative of the output voltage to create a resultant;
    determining a charge pump ratio based on the resultant, a threshold ratio value, and a hysteresis; and
    changing an operating feature of the charge pump based on the charge pump ratio.

11. The method of claim 1 wherein the main voltage converter is a charge pump, and the method further comprises:
    reading, by a pump controller, a value indicative of a voltage supplied to the charge pump, the pump controller implemented on the semiconductor substrate;
    reading, by the pump controller, a value indicative of the output voltage of the charge pump;
    dividing, by the pump controller, the value indicative of the voltage supplied by the value indicative of the output voltage to create a resultant;
    determining a charge pump ratio based on the resultant, a threshold ratio value, and a hysteresis; and
    changing an operating feature of the charge pump based on the charge pump ratio.

12. An integrated circuit on a semiconductor substrate, comprising:
    a processing core;
    a system memory coupled to the processing core;
    a main voltage converter that defines a main control input, a main supply input, and a main voltage output, the main voltage converter configured to vary a voltage driven to the main voltage output responsive to the main control input;
a logic gate delay line embedded within the processing core, the logic gate delay line defines a plurality of gate outputs; and
a supply controller that defines a plurality of gate inputs coupled to the plurality of gate outputs of the logic gate delay line, and a main control output coupled to the main control input of the main voltage converter, and the supply controller configured to:
    read the plurality of gate outputs from the logic gate delay line;
    create a logic speed measurement based on reading the plurality of gate outputs;
    compute a speed margin based on the logic speed measurement; and
    drive a value indicative of a modified voltage level to the main control output responsive to the speed margin.

13. The integrated circuit of claim 12 wherein the logic gate delay line further comprises a plurality of serially aligned buffers disposed alongside a logic path within the processing core.

14. The integrated circuit of claim 12 wherein the supply controller further comprises:
    a target speed register coupled to a communication bus;
    wherein when the supply controller computes the speed margin, the supply controller is further configured to determine a difference between the logic speed measurement and a target speed value held in the target speed register.

15. The integrated circuit of claim 14 wherein when the supply controller determines the difference between the logic speed measurement and the target speed value, the supply controller is configured to determine an amount the logic speed measurement was faster or slower than the target speed value.

16. The integrated circuit of claim 12 wherein when the supply controller reads the plurality of gate outputs from the logic gate delay line, the supply controller is configured to determine a distance along the logic gate delay line an asserted stated propagated within a predetermined period of time.

17. The integrated circuit of claim 12 wherein the main voltage converter further comprises at least one selected from a group consisting of: a charge pump; a switched-mode power supply; a linear regulator; and a charge pump and a linear regulator.

18. The integrated circuit of claim 12 further comprising:
    a drive output defined by the main voltage converter;
    a body voltage converter that defines a body control input, a body supply input, and a body voltage output, the body supply input coupled to the main voltage output, and the body voltage output coupled to body connections of transistors within the processing core, the body voltage converter configured to vary a voltage driven to the body connections of the transistors within the process core responsive to the body control input; and
    a body voltage controller that defines a drive input coupled to the drive output of the main voltage converter, and a body control output coupled to the body control input of the body voltage converter, the body voltage controller configured to:
        measure a signal indicative of power consumption by way of the drive output of the main voltage converter; and
        create a value indicative of a modified body voltage responsive to the signal indicative of power consumption; and
        drive the value indicative of the modified body voltage to the body control output.

19. The integrated circuit of claim 18 wherein when the body voltage controller creates the value indicative of the modified body voltage, the body voltage controller is configured to create the value indicative of a modified voltage to at least one selected from a group comprising: reduce power consumption of the transistors; and reduce leakage current of the transistors in the processing core.

20. The integrated circuit of claim 18 wherein:
    the main voltage converter comprises a charge pump; and
    wherein when the body voltage controller measures the signal indicative of power consumption, the body voltage controller is further configured to count a number of pump actions performed by the charge pump over a predetermined period of time.

21. The integrated circuit of claim 18 wherein:
    the main voltage converter comprises a switched-mode power converter; and
    wherein when the body voltage controller measures the signal indicative of power consumption, the body voltage controller is further configured to count a number of main switch assertions of the switched-mode power converter over a predetermined period of time.

22. The integrated circuit of claim 18 further comprising:
    the main voltage converter further comprises a charge pump and defines a pump ratio input, the charge pump configured to operate with an operating feature responsive to the pump ratio input;
    a pump controller that defines a first input coupled to the main supply input of the charge pump, a second input coupled to the main voltage output of the charge pump, and a pump ratio output coupled to the pump ratio input of the charge pump, the pump controller configured to:
        read, by way of the first input, a value indicative of a voltage supplied to the charge pump by way of the first input;
        read, by way of the second input, a value indicative of the voltage driven to the main voltage output;
        divide the value indicative of the voltage supplied to the charge pump by the value indicative of the voltage driven to the main voltage output, the division creates a resultant;
        determine a charge pump ratio based on the resultant, a threshold ratio value, and a hysteresis; and
        drive the charge pump ratio to the pump ratio input of the charge pump.

23. The integrated circuit of claim 12 further comprising:
    the main voltage converter further comprises a charge pump and defines a pump ratio input, the charge pump configured to operate with an operating feature responsive to the pump ratio input;
    a pump controller that defines a first input coupled to the main supply input of the charge pump, a second input coupled to the main voltage output of the charge pump, and a pump ratio output coupled to the pump ratio input of the charge pump, the pump controller configured to:
        read, by way of the first input, a value indicative of a voltage supplied to the charge pump by way of the first input;
        read, by way of the second input, a value indicative of the voltage driven to the main voltage output;

divide the value indicative of the voltage supplied to the charge pump by the value indicative of the voltage driven to the main voltage output, the division creates a resultant;

determine a charge pump ratio based on the resultant, a threshold ratio value, and a hysteresis; and drive the charge pump ratio to the pump ratio input of the charge pump.

24. An integrated circuit package, comprising:

a first semiconductor die comprising:
- a processing core;
- a system memory coupled to the processing core;
- a bidirectional communication bus coupled to the processing core;
- a main voltage converter that defines a main control input, a main supply input, and a main voltage output, the main voltage converter configured to vary a voltage driven to the main voltage output responsive to the main control input;
- a logic gate delay line embedded within the processing core, the logic gate delay line defines a plurality of gate outputs; and
- a supply controller that defines a plurality of gate inputs coupled to the plurality of gate outputs of the logic gate delay line, and a main control output coupled to the main control input of the main voltage converter, and the supply controller configured to:
  - read the plurality of gate outputs from the logic gate delay line;
  - create a logic speed measurement based on reading the plurality of gate outputs;
  - compute a speed margin based on the logic speed measurement; and
  - drive a value indicative of a modified voltage level to the main control output responsive to the speed margin;

a second semiconductor die comprising a wireless communication circuit coupled to the bidirectional communication bus, the wireless chip configured communicate wirelessly to devices outside the integrated circuit package;

wherein the first semiconductor die and the second semiconductor die are co-packaged into the integrated circuit package.

25. The integrated circuit package of claim 24 wherein the first semiconductor die further comprises:

a drive output defined by the main voltage converter;

a body voltage converter that defines a body control input, a body supply input, and a body voltage output, the body supply input coupled to the main voltage output, and the body voltage output coupled to body connections of transistors within the processing core, the body voltage converter configured to vary a voltage driven to the body connections of the transistors within the process core responsive to the body control input; and a body voltage controller that defines a drive input coupled to the drive output of the main voltage converter, and a body control output coupled to the body control input of the body voltage converter, the body voltage controller configured to:

measure a signal indicative of power consumption by way of the drive output of the main voltage converter; and create a value indicative of a modified body voltage responsive to the signal indicative of power consumption; and drive the value indicative of the modified body voltage to the body control output.

26. The integrated circuit package of claim 25 wherein when the body voltage controller creates the value indicative of the modified body voltage, the body voltage controller is configured to create the value indicative of the modified voltage to at least one selected from a group comprising: reduce power consumption of the transistors; and reduce leakage current of the plurality of transistors.

27. The integrated circuit package of claim 25 wherein the first semiconductor die further comprises:

a neural network accelerator coupled to a weights memory;

the neural network accelerator and configured to:
- fetch a plurality of weights of a neural network from the weights memory; and
- perform neural network processing, where the neural network processing comprises a plurality of multiply-accumulate (MAC) operations that operate in parallel to multiply an input value and a weight selected from the plurality of weights to accumulate a result of the multiplication to a sum of products representing a value corresponding to a neuron in the neural network.

28. The integrated circuit package of claim 25:

the main voltage converter comprises a charge pump;

wherein when the body voltage controller measures the signal indicative of power consumption, the body voltage controller is further configured to count a number of pump actions performed by the charge pump over a predetermined period of time.

29. The integrated circuit package of claim 25:

the main voltage converter comprises a switched-mode power converter;

wherein when the body voltage controller measures the signal indicative of power consumption, the body voltage controller is further configured to count a number of main switch assertions of the switched-mode power converter over a predetermined period of time.

30. The integrated circuit package of claim 25 wherein the main voltage converter further comprises a charge pump and defines a pump ratio input, the charge pump configured to operate with an operating feature responsive to the pump ratio input, and wherein the first semiconductor die further comprises:

a pump controller that defines a first input coupled to the main supply input of the charge pump, a second input coupled to the main supply output of the charge pump, and a pump ratio output coupled to the pump ratio input of the charge pump, the pump controller configured to:

read, by way of the first input, a value indicative of a voltage supplied to the charge pump by way of the first input;

read, by way of the second input, a value indicative of the voltage driven to the main voltage output;

divide the value indicative of the voltage supplied to the charge pump by the value indicative of the voltage driven to the main voltage output, the division creates a resultant;

determine a charge pump ratio based on the resultant, a threshold ratio value, and a hysteresis; and drive the charge pump ratio to the pump ratio input of the charge pump.

31. The integrated circuit package of claim 24 wherein the main voltage converter further comprises a charge pump and defines a pump ratio input, the charge pump configured to operate with an operating feature responsive to the pump ratio input, and wherein the first semiconductor die further comprises:
    a pump controller that defines a first input coupled to the main supply input of the charge pump, a second input coupled to the main voltage output of the charge pump, and a pump ratio output coupled to the pump ratio input of the charge pump, the pump controller configured to:
        read, by way of the first input, a value indicative of a voltage supplied to the charge pump by way of the first input;
        read, by way of the second input, a value indicative of the voltage driven to the main voltage output;
        divide the value indicative of the voltage supplied to the charge pump by the value indicative of the voltage driven to the main voltage output, the division creates a resultant;
        determine a charge pump ratio based on the resultant, a threshold ratio value, and a hysteresis; and
        drive the charge pump ratio to the pump ratio input of the charge pump.

\* \* \* \* \*